(12) United States Patent
Schumacher

(10) Patent No.: US 6,837,127 B2
(45) Date of Patent: Jan. 4, 2005

(54) PARKING BRAKE

(75) Inventor: Bernd Schumacher, Niederalteich (DE)

(73) Assignee: EDSCHA AG, Remscheid (DE)

( * ) Notice: Subject to any disclaimer, the term of this patent is extended or adjusted under 35 U.S.C. 154(b) by 0 days.

(21) Appl. No.: 10/297,861

(22) PCT Filed: Jun. 12, 2001

(86) PCT No.: PCT/DE01/02205

§ 371 (c)(1),
(2), (4) Date: Dec. 9, 2002

(87) PCT Pub. No.: WO01/96161

PCT Pub. Date: Dec. 20, 2001

(65) Prior Publication Data

US 2003/0164059 A1 Sep. 4, 2003

(30) Foreign Application Priority Data

Jun. 16, 2000 (DE) .......................... 100 29 752

(51) Int. Cl.⁷ ............................ G05G 1/14; G05G 1/00; G05G 3/00
(52) U.S. Cl. .............................. 74/512; 74/560; 74/575; 74/535; 74/538
(58) Field of Search .......................... 74/512, 513, 514, 74/529, 560, 575, 576, 577 R, 577 M, 578, 535, 537, 538

(56) References Cited

U.S. PATENT DOCUMENTS

| | | | | |
|---|---|---|---|---|
| 3,861,237 A | * | 1/1975 | Mounts | 74/516 |
| 3,929,033 A | * | 12/1975 | Marx | 74/512 |
| 4,149,433 A | | 4/1979 | Schroeter | 74/516 |
| 5,182,963 A | | 2/1993 | Perisho et al. | 74/512 |
| 5,588,335 A | * | 12/1996 | Strait | 74/512 |
| 5,609,066 A | * | 3/1997 | Bunker et al. | 74/537 |
| 5,611,249 A | * | 3/1997 | Perisho et al. | 74/512 |
| 5,950,496 A | * | 9/1999 | Rampp | 74/538 |

FOREIGN PATENT DOCUMENTS

| | | | | |
|---|---|---|---|---|
| DE | 2805192 | | 8/1979 | |
| DE | 35 00315 A1 | * | 7/1986 | 74/512 |
| DE | 19625804 | | 1/1998 | |
| EP | 0600763 | | 6/1994 | |
| EP | 0988199 | | 12/1998 | |
| FR | 2536714 | | 6/1984 | |
| FR | 2571868 | * | 4/1986 | 74/512 |
| GB | 1398271 | | 6/1975 | |
| JP | 10-287217 | * | 10/1998 | 74/512 |
| WO | 9857832 | | 12/1998 | |

* cited by examiner

Primary Examiner—Vinh T. Luong
(74) Attorney, Agent, or Firm—Davidson, Davidson & Kappel, LLC

(57) ABSTRACT

A parking brake for a vehicle includes a lever holder including a housing that has a first flat side and a second flat side and a brake actuation lever pivotably arranged on the lever holder. The brake actuation lever is articulated to the first flat side and to the second flat side. The parking brake also includes a locking arrangement for holding the brake actuation lever in a locking position, a brake cable, and a deflection lever pivotably articulated to the first flat side and to the second flat side of the housing. The deflection lever is pivotably linked with the brake actuation lever. In addition, the parking brake includes a coupling unit disposed on the deflection lever for tensioning the brake cable during a displacement of the brake actuation lever.

25 Claims, 4 Drawing Sheets

PARKING BRAKE

BACKGROUND OF THE INVENTION

The invention relates to a parking brake for a vehicle, comprising a brake actuation lever which is arranged in a jointed manner on a lever holder; a coupling unit which tensions a brake cable during the displacement of the brake actuation lever; a locking device, in order to hold the brake actuation lever in a locking position; and a deflection lever which is articulated pivotably on the lever holder and which is connected in a jointed manner to the brake actuation lever and has the coupling unit for the brake cable.

Parking brakes, in particular foot-operated parking brakes for motor vehicles, are known from practice, which, when a brake actuation lever designed, for example, with a pedal is actuated, exert a corresponding pull on a brake cable pulling on the brake shoes of the parking brake, the latter being tensioned thereby. One disadvantage of these parking brakes is that the lever arm of the pedal, on the one hand, and the distance of the articulation of the brake cable from the body-fixed articulation point of the brake actuation lever, on the other hand, defines unfavorable lever ratios (about 1 to 2), so that, in practice, tension members which bring about a step-up of about four times the pull exerted on them have to be installed between a first and a second part of the brake cable. Such tension members present problems, because, as a rule, the adjustment of the brake cable because of the wear of the brake linings is possible only on one part of the brake cable and the adjustment can therefore be compensated only inadequately. Moreover, these parts make it difficult to install the brake cable, because the latter can be led only at a distance from these and therefore mounting becomes more costly. In addition, such a tension member always constitutes the weak point for material faults and mounting errors.

DE-A-28 05 192 shows a manually actuable parking brake, in which a brake actuation lever is arranged about a pivot axis on a lever holder, furthermore, an intermediate lever being arranged in a jointed manner on the brake actuation lever, the other end of the intermediate link being coupled in an articulated manner to one corner of an essentially triangular deflection lever which is articulated on the lever holder in a further corner and in a third corner provides the possibility of coupling for a brake linkage. A pawl arranged on the brake actuation lever makes it possible to lock the parking brake due to cooperation with a stationary circumferential toothing of the lever holder. The known parking brake has the disadvantage that it requires a relatively large construction space, since the pivoting circle of the link connection point between the intermediate link and the deflection lever has to pivot past the articulation of the brake actuation lever, and, furthermore, the articulations and the deflection lever and the brake actuation lever have to be provided next to one another on the same lever holder. Moreover, the materials of the various levers are also protected, in the region of their articulation, against momentums which arise due to the one-sided lateral mounting of the respectively pivotable part, so that the articulation points and the pin materials must be produced with the appropriate strengths, since they are mounted only on one side. However, The present design of the intermediate lever and deflection lever does not allow mounting on both sides.

DE-A-196 25 804 describes a parking brake, in which a brake actuation lever is pivotably arranged at an articulation point on a lever holder, a bearing point for jointed connection to a deflection lever being provided. The deflection lever has an essentially triangular configuration, in the first corner of which the bearing point is provided and in the second corner of which the cable outlet is arranged. The third corner of the deflection lever is designed as a bearing point for a roller which can be tracked along a lever-holder profile having an indentation. As a result of this rolling, the actuation resistance of the parking brake is increased and, moreover, a favorable transmission ratio is not defined. The parts of the parking brake are arranged on one side of the lever holder.

SUMMARY OF THE INVENTION

An object of the invention is to provide a parking brake, which, along with a small build, improves cost-effectively the transmission ratio between brake actuation lever and cable outlet.

The present invention provides a parking brake for a vehicle that includes a lever holder including a housing that has a first flat side and a second flat side and a brake actuation lever pivotably arranged on the lever holder. The brake actuation lever is articulated to the first flat side and to the second flat side. The parking brake also includes a locking arrangement for holding the brake actuation lever in a locking position, a brake cable, and a deflection lever pivotably articulated to the first flat side and to the second flat side of the housing. The deflection lever is pivotably linked with the brake actuation lever. In addition, the parking brake includes a coupling unit disposed on the deflection lever for tensioning the brake cable during a displacement of the brake actuation lever.

The parking brake according to the invention affords a favorable transmission ratio by the provision of a deflection lever which is pivotable relative to the lever holder and which is connected in a jointed manner to the brake actuation lever, the deflection lever having the coupling unit for the brake cable (cable outlet). The jointed connection of the brake actuation lever to the deflection lever defines a favorable transmission ratio which makes it possible to actuate the brake cable without additional tension members arranged in the brake cable.

Expediently, the brake actuation lever is connected, via an intermediate lever, arranged in a jointed manner on the latter, to the deflection lever, the intermediate lever also being connected in a jointed manner to the deflection lever. By virtue of this arrangement, the jointed connection between the brake actuation lever and the deflection lever is made into two jointed connections, thus making it possible to have a more complex relative change in position of the two parts in relation to one another during pivoting about their respective articulations on the lever holder. As a result, the joints on which the intermediate lever is arranged can be pivoted according to different curve radii about the articulations of the two levers on the lever holder, and at the same time an improvement in the transmission ratios can be achieved by the selection of the articulation points for the deflection lever. The brake actuation lever and the deflection lever can thereby also be designed to engage one into the other, thus producing a particularly compact structural unit and allowing the levers to pivot past one another mutually.

Preferably, the deflection lever has the toothed quadrant at an edge boundary, in this case the locking pawl being arranged in a jointed manner on the lever holder. As a result, due to the displacement of the deflection lever, the parking brake and consequently also the brake actuation lever can be held in a locking position, and, owing to the arrangement of the toothed quadrant on the deflection lever, the extent of the latter owing to the transmission ratio is compact. It is therefore possible to lock the parking position of the parking brake by means of a small number of teeth of the toothing.

The locking pawl is expediently prestressed in the direction of the toothed quadrant by means of a pawl spring, the prestress of the pawl spring being capable of being cancelled by the actuation of a push button or by pulling a pawl linkage, in order to release the parking position. The pawl spring is designed, for example, as a torsion spring, one leg of which is arranged on the lever holder and the other leg of which is arranged on the lever arm, facing the toothing, of the locking pawl which has an engagement nose.

The deflection lever advantageously pivots past the joint connecting the brake actuation lever to the lever holder, for which purpose a long hole or a recess in the deflection lever is advantageously provided, in order to allow this relative movement. The long hole may have either a linear extent or a curved contour, the configuration of the long hole expediently resulting from the jointed connection of the brake actuation lever and of the deflection lever. The provision of a long hole has the advantage, in particular, that the strength of the deflection lever is hardly diminished as a result, and force transmission, which is important for the transmission ratio, can take place without critical bending moments arising.

In the parking brake according to the invention, the lever holder is designed in the manner of a housing with two flat sides, the deflection lever and the brake actuation lever being articulated in the interspace between the flat sides of the lever holder. The housing forming the lever holder may selectively be arranged on the body in the manner of a bridge girder, if the parking brake is designed as a hand-operated parking brake, or else fastened laterally to an extension of, for example, the A-pillar of the motor vehicle on the driver's side, if the parking brake is designed as a foot-operated parking brake. The design as a housing with two flat sides advantageously provides a compact arrangement which can be mounted according to the available space.

Preferably, the housing has an orifice which is arranged in the region of a narrow side and which at least partially allows the passage of the brake actuation lever and expediently also the passage of the deflection lever or a part of the deflection lever which is pivoted out of the housing when the brake actuation lever is actuated.

The deflection lever, too, is expediently designed in the manner of a receptacle with two flat sides, the two flat sides of the receptacle each having a recess, through which passes a joint connecting the brake actuation lever to the lever holder, the recess in the two flat sides advantageously being designed as a long hole. One narrow side of the receptacle allows the passage of the brake actuation lever which, moreover, is articulated on the lever holder within the receptacle. The toothed quadrant, too, may be arranged, with an outwardly directed toothing, between the two flat sides of the deflection lever designed as a receptacle, in which case the receptacle is advantageously designed as a sheet-metal pressed part bent toward itself and holds a toothed quadrant clamped in.

In the above embodiment, even when an intermediate lever is provided, it is advantageously possible for the pivotally moveable parts to be nested within the housing, in such a way that the brake actuation lever, the deflection lever and the intermediate lever are designed to engage one into the other and are therefore arranged in a highly compact manner. Owing to the nested design, the parts can pivot past one another and achieve high lever ratios, without the parts having to be arranged, for this purpose, outside the pivoting paths overlapping one another. Appropriate perforations may be provided in a region in which the moved levers pivot past articulations of parts in the housing. The construction as a nested arrangement gives both the housing and the lever high stability in spite of relatively small wall thicknesses. Furthermore, the articulation of the parts on both sides leads to favorable protection against momentums occurring during actuation, and the forces acting on the articulation points are correspondingly distributed to two sides.

Another preferred embodiment of a parking brake according to the invention provides for arranging the brake actuation lever, deflection lever and intermediate lever in the lever holder, without these parts engaging one into the other, so that there is advantageously no need for complicated nesting and for the provision of free cuts for a mutual pivoting. In this case, the deflection lever, which is equipped with the coupling unit for the brake cable, is connected to the brake actuation lever via an intermediate lever arranged in the lever holder, the intermediate lever transmitting a pulling movement, when the brake actuation lever is actuated, to the deflection lever and pivoting the latter about its articulation on the lever holder in the direction of the brake actuation lever or the articulation of the latter. When a locking device fixing the brake actuation lever is released, the deflection lever pulls the brake actuation lever back into its initial position via the intermediate lever under the return force of the brake cable.

Preferably, in this case, the brake actuation lever is connected in a jointed manner to the intermediate lever via an intermediate part, the intermediate part, on the one hand, carrying the articulation with the intermediate lever and, on the other hand, being articulated, together with the brake actuation lever, on the lever holder and, moreover, embodying the toothed quadrant, by means of which the brake actuation lever can be fixed in relation to a pawl arranged on the lever holder. In this case, the intermediate part having the toothed quadrant may be perforated in a central region for reasons of increased rigidity and weight saving, while the remaining parts of the intermediate part are produced solid, and thus allow good force transmission between the brake actuation lever and intermediate lever. To make a rigid connection between the brake actuation lever and intermediate part, it is possible to couple these two parts to one another by riveting or the like, both parts, moreover, being articulated on the lever holder about the same main joint.

In this case, the deflection lever has an extremely compact design, since its extent is restricted by the three ends at which articulations are provided: at one end of the triangular deflection lever, the articulation of the latter on the lever holder is provided, at the second end the, articulation with the intermediate lever for connection to the brake actuation lever is provided, and at the third end, the coupling unit for the brake cable is provided. Here, too, favorable transmission ratios for action upon the brake cable arise, since the center distances between the various articulations are provided in the otherwise compact lever holder.

The parking brake according to the invention makes it possible, along with a small build, to achieve a step-up of the brake actuation lever with respect to the break cable to a factor of between five and eleven, preferably between eight and ten. It has to be understood that, as before, brake booster members may be provided in the region of the brake cable, but this is advantageously no longer necessary. In particular, a transmission ratio can be established which has a dimension suitable for motor vehicle parking brakes and which manages without brake intensifiers. The amount of the step-up is obtained from the expedient selection of the distance between the joints of the levers.

Preferably, the coupling unit comprises an adjustment device for the brake cable, as is known, for example, from WO-A-98 57 832, by means of which adjustment device the brake cable is adjusted by means of spring force, with the parking brake deposed or not actuated, in order, in response to pronounced temperature differences, but, in particular, because of the wear of the brake linings, to bring about a tight tensioning of the brake cable at any time after the release of the parking brake.

The parking brake according to the invention may equally be designed as a hand-operated parking brake with a handle, in which a push button actuates the release function of the locking pawl, and as a foot-operated parking brake, in which the brake actuation lever is provided with a pedal and the release of the locking pawl is implemented via a pull mechanism.

Further advantages and features of the invention may be gathered from the following description and from the claims.

BRIEF DESCRIPTION OF THE DRAWINGS

The invention is explained in more detail below by means of preferred exemplary embodiments of a parking brake according to the invention, with reference to the accompanying drawings.

DETAILED DESCRIPTION

Figure 1:
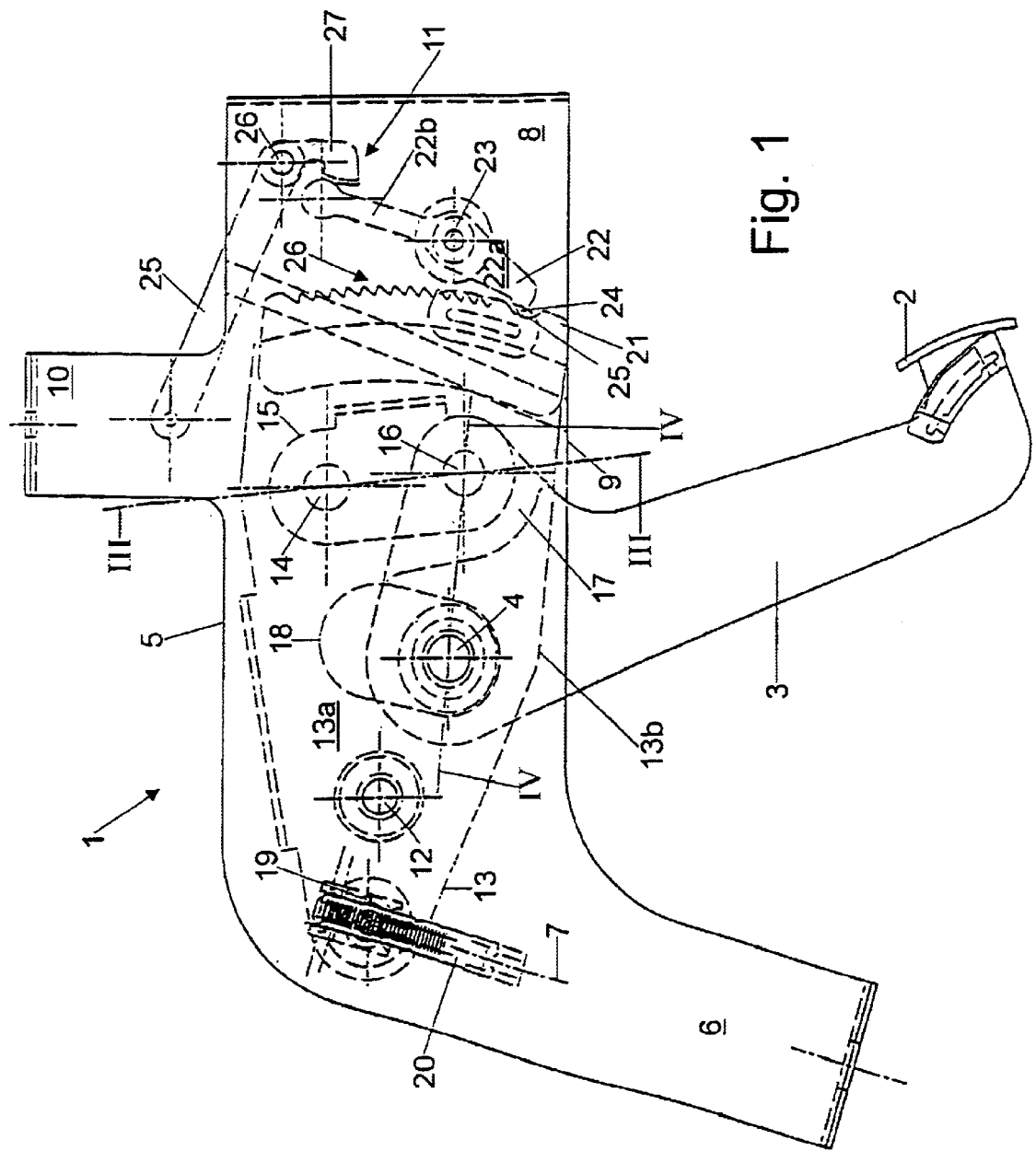
FIG. 1 shows a side view of a preferred exemplary embodiment of a parking brake according to the invention.

The parking brake illustrated in FIGS. 1 to 4 is a foot-operated parking brake 1 which, by the pedal 2 being depressed, displaces the brake actuation lever 3 carrying the pedal 2, about the articulation 4 of said brake actuation lever, on the lever holder, designed as a housing 5, of the parking brake. The housing 5 is fastened, fixed to the body, in the vicinity of the A-pillar of a motor vehicle and can therefore be operated, for example, by the left foot of a vehicle driver. An extension 6 of the housing 5 serves as a casing for a brake cable which is indicated by the axis 7 and which makes a connection to the brakes (not illustrated) on the wheels of the motor vehicle.

The lever holder 5 designed as a housing is a sheet-metal pressed part which has, parallel to the sheet plane of the illustration from FIG. 1, two flat sides 8, between which the articulation 4 of the brake actuation lever 3 and further parts illustrated in more detail below are arranged. On the narrow side indicated in FIG. 1 by the reference symbol 9, the housing 5 is designed to be open, in order to allow the passage of the brake actuation lever 3 and of further parts. Alternatively, it is possible for the housing 5 to have a larger design, in order, for visual reasons, to allow only the brake actuation lever 3 to pass through, but not further parts. A further extension of the housing 5 is indicated by the reference symbol 10 and serves for guiding a trigger device 11 for the parking brake 1.

Within the lever holder 5 designed as a housing, and connected pivotably to said lever holder via an articulation 12, is a deflection lever 13 which is connected to an intermediate lever 15 via a rotary joint 14, said intermediate lever 15 being connected pivotably, via a further joint 16 to a projection, designated by 17, of the brake actuation lever 3. The deflection lever 13, moreover, has a long hole 18, through which passes the rotary joint 4 connecting the lever holder 5 to the brake actuation lever 3, in order to allow the deflection lever 13 to pivot past in relation to the joint 4. The deflection lever has, at its left end which is outermost in FIG. 1, a cable outlet, designated by 19, which, with respect to the articulation 12 of the deflection lever 13, is arranged opposite the jointed connection 4 of the brake actuation lever 3. The cable outlet 19 defining a coupling unit comprises an adjustment device 20 for the brake cable 7, said adjustment device being designed in such a way that, via a spring and a slide, it tensions the brake cable 7 according to the spring force, the slide being fixed via a latching device when tensile stress is transmitted to the brake cable 7 as a result of the displacement of the brake actuation lever 3. Arranged at that end of the deflection lever 13 which is located opposite the cable outlet 19 is a toothed quadrant 21 which is produced, for example, as a stamped or forged part and which is fixedly connected to a deflection lever 13.

The deflection lever 13 is produced as a receptacle designed with two flat sides 13a, the long hole 18 being provided in both flat sides 13a. These are produced as a sheet-metal pressed part and hold the toothed quadrant 21, for example, by riveting or when the toothed quadrant is pressed in between the two flat sides 13a. Introduced between the two flat sides 13a of the deflection lever 13 designed as a receptacle, through a longitudinal edge, designed as an orifice 13b, of the receptacle 13, is that end of the brake actuation lever 3 which faces away from the pedal 2, and, and has a projection 17, furthermore, the intermediate lever 15 and, finally, the joints 14, 16 connecting the intermediate lever 15 to the two levers 3, 13. The section along the line III—III in FIG. 1 through the centers of the joints 14, 16 shows the arrangement of the three levers in relation to one another, the intermediate lever 15 being designed as a sheet-metal pressed part or the like, again as a hollow part with flat sides.

Within the lever holder 5 designed as a housing, a locking pawl 22 is connected pivotably to said lever holder via a rotary joint 23, a short lever arm 22a of the locking pawl 22 having an engagement nose 24 which is deposited in a rest part 25 of the toothing 21, said rest part preceding the actual teeth 26 of the toothed quadrant 21. By contrast, in the illustration according to FIG. 2, the engagement nose 24 is engaged between two teeth 26 of the toothed quadrant 21. A torsion spring (not illustrated), supported with one leg against the lever 22a and with the other leg against the housing 5, prestresses the locking pawl 22 in the direction of the toothed quadrant 21, the overcoming of a tooth 26 tensioning the locking pawl 22 counterclockwise in the illustration according to FIG. 1, counter to the prestress of the spring, and engagement into a valley provided between two teeth causing the engagement nose 24 to engage into said valley under the prestress of the torsion spring.

Figure 2:
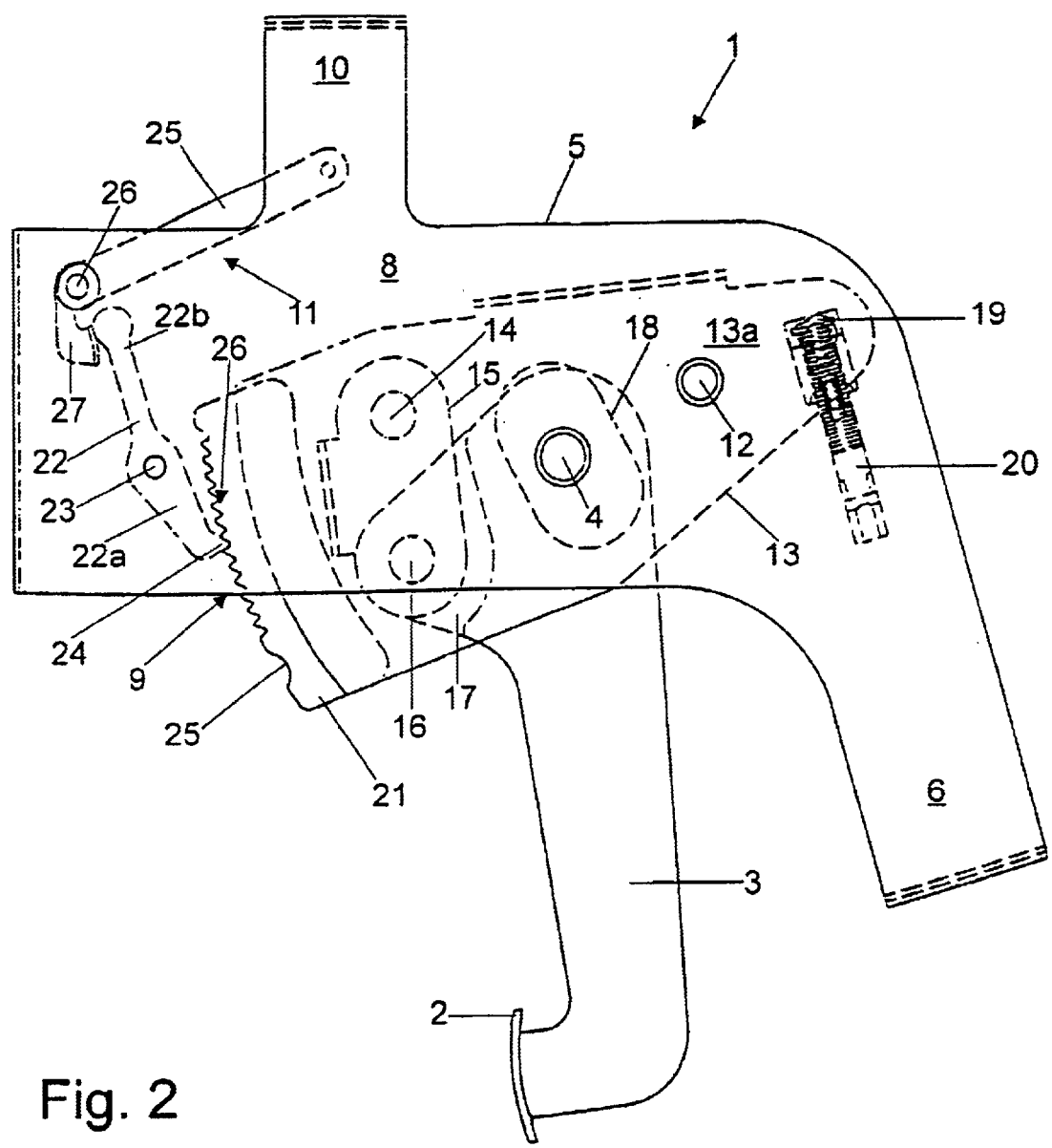
FIG. 2 shows a side view of the parking brake from FIG. 1 from the other side, in the actuated state.

Arranged in the region of the longer lever 22b of the locking pawl 22 is the trigger device 11 which has a linkage 25 connected to the housing 5 via a rotary joint 26, the rotary joint 26 having arranged on it, furthermore, a driver 27 which, when the trigger device 11 is actuated, displaces the long lever 22b of the locking pawl counter to the prestress of the torsion spring, so that the engagement nose 24 comes out of engagement with the toothing of the toothed quadrant 21 and thus allows the deflection lever 13 to pivot about its rotary joint 12. Starting from the parking position, as illustrated in FIG. 2, on the one hand, this takes place via the tension transmitted by the brake cable 7, but, on the other hand, a spring (not illustrated) is also provided, which prestresses the deflection lever 13 against the lever holder 5 and thus brings about a complete return movement of the deflection lever 13. In this case, the joint 4 at the same time defines a limit stop, but it is possible to provide a further stop, in order to prevent damage in the region of the long hole 18 or of the joint 4.

The trigger device 11 may be triggered selectively by the actuation of a push button or by the pulling of a lever, the compressive force or tensile force being transmitted to the driver 27 according to the actuation unit.

Figure 3:
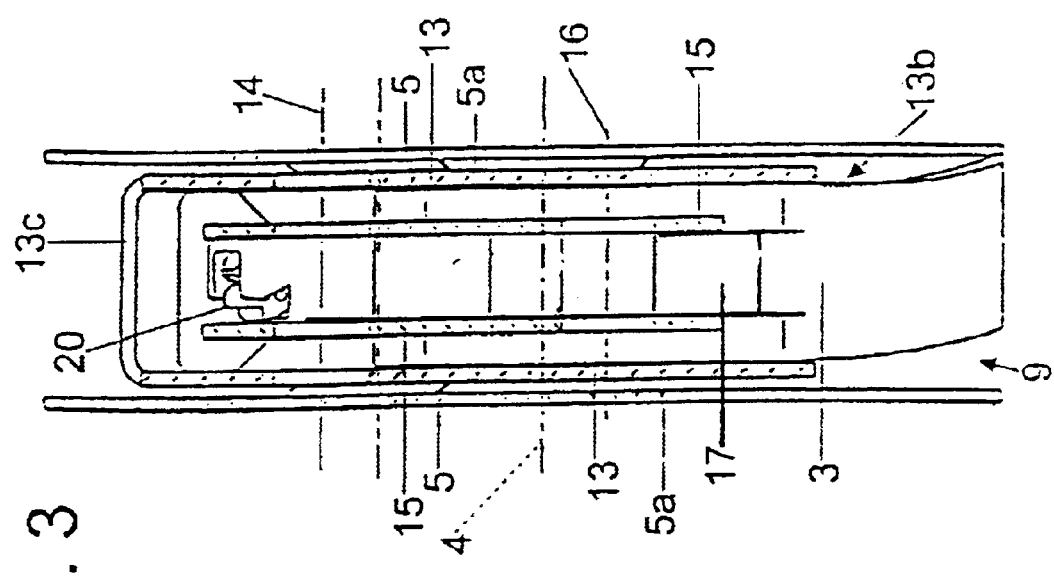
FIG. 3 shows a section through the parking brake from FIGS. 1 and 2 along the line III—III.

The illustration according to FIG. 3 shows the section along the line III—III from FIG. 1, the joints 14 and 16 being illustrated by their axes, so as not to be detrimental to the clarity of the illustration. It can be seen that the lever holder 5, the deflection lever 13 and the intermediate lever 15 are formed as hollow sandwich-like elements, the section extending through the two flat sides. It can be seen, furthermore, that the deflection lever 13 partially connects the flat sides 13a to one another via bent portions 13c on its narrow side located opposite the orifice 13b. Finally, it can be seen that the projection 17 of the brake actuation lever 3, which is partially in section in the illustration according to FIG. 3, is a centrally projecting portion which is surrounded by the intermediate lever 15. Finally, there can also be seen, behind the sectional line III—III, notches or beads 5a of the lever holder 5 which, directed into the housing 5, project on both sides from the sheet-metal material of the latter and come into bearing contact against the flat sides 13a of the deflection lever 13, in order to guide the latter laterally. The axis of the joint 4 (which cannot be seen) is indicated by 4.

Figure 4:
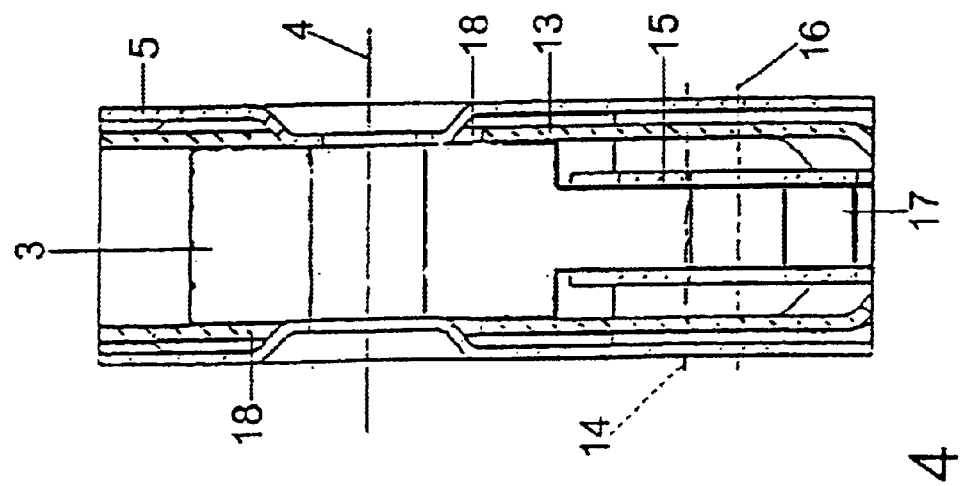
FIG. 4 shows a section through the parking brake from FIGS. 1 to 3 along the line IV—IV.

Referring to FIG. 4, of which the associated sectional line IV—IV from FIG. 1 extends through the center points of the joints 4 and 16, which are again illustrated merely by their axes, it can be seen that the intermediate lever 15 surrounds the projection 17 of the brake actuation lever 3 on both sides, with the projection 17 having a thickness of approximately half that of the brake actuation lever 3 and being continued centrally from the latter. It can be seen, furthermore, that the deflection lever 13 defining a receptacle comes to bear with its two flat sides 13a against the likewise flat outer faces of the brake actuation lever 3 and thus guides the latter laterally. The articulation 4 of the brake actuation lever 3 with the lever holder 5 is formed in the region of the hole 18 in such a way that the sheets are bent inward from the flat sides of the lever holder 5 and are moved into the prolongation of the metal sheet of the flat sides 13a. The long hole 18 is designed in such a way that there is no contact of the inwardly directed flat sides of the housing 5 with the deflection lever 13 when the latter is displaced in relation to the joint axis 4 owing to the actuation of the brake actuation lever 3. Finally, the axis, which cannot be seen, of the joint 14 is also indicated by broken lines in FIG. 4.

It can be seen that the distance between the axes of the joints 4 and 16, on the one hand, and the distance between the axes of the joints 16 and 14, on the other hand, and also, finally, the distance between the axes of the joints 14 and 12 define a transmission ratio which is substantially higher than would be the case in a direct arrangement of the brake actuation lever 3 on the deflection lever 13, if it is taken into account that the distance between the axes of the joint 12 and of the cable outlet 19 defines the other lever arm. Thus, the suitable selection of the axis center distances, a transmission ratio of approximately 1:8.5 is obtained in the present exemplary embodiment, the result of this advantageously being that no tension members have to be arranged in the brake cable 7, with the consequence that the adjustment device 20 for the brake cable 7 can be arranged directly at the cable outlet 19. The sensitive cable adjustment device 20 is thereby arranged outside the point of access for roaming animals, such as martens or the like, and, in the case of repairs, is easily accessible via, for example, a swing-up flat side of the housing 5.

The parking brake 1, then, functions as follows:

In its released or deposed initial position, the foot-operated parking brake 1 is in the position illustrated in FIG. 1. The engagement nose 24 of the locking pawl 22 is deposited in the rest space 25, and the adjustment device 20, by virtue of the force of its spring, adjusts the brake cable 7. When the brake actuation lever 3, then, is pivoted about its articulation 4 by the pedal 2 being depressed, a locking mechanism of the adjustment device 20 causes the brake cable 7 to be locked in the set position, and, via the extension 17, the joint 16 is pivoted about the articulation 4 at its distance from the latter, the intermediate lever 15 transmitting this pivoting movement, in turn, via its articulation 14 to the deflection lever 13, with the result that the latter likewise executes a pivoting movement about its joint 12 in relation to the lever holder 5. At the same time, the narrow side 13b of the deflection lever 13 is displaced downward and emerges through the orifice 9 of the housing 5, the toothed quadrant 21 being pivoted about the axis 12 through the same angle, with the result that the locking pawl 22 is induced, counter to the spring force loading it, to engage over the toothing 26 of the toothed quadrant 21. When the pressure on the pedal 2 and therefore on the brake actuation lever 13 is ended, the engagement nose 24 of the locking pawl 22, by its intermeshing with the toothing 26, holds the deflecting lever 13 in its pivoted position, as illustrated in FIG. 2, the illustration according to FIG. 2 in the other side view indicating that parts of the deflection lever 13 and even of the intermediate lever 15 project from the housing 5 on the underside 9.

In order, starting from the position, illustrated in FIG. 2, of the foot-operated parking brake 1 held in a parking position, to go back again into the initial position illustrated in FIG. 1, a lever (not illustrated) which is connected to the linkage 15 is pulled, with the result that the driver 27 displaces the long lever arm 22b of the locking pawl 22 counter to the prestress of the spring of the latter and brings the engagement nose 24 out of engagement with the toothing 26, with the result that the spring (not illustrated) and the force loading the brake cable 7 pivot the deflection lever 13 back into its initial position, the intermediate lever 15 and the brake actuation lever 3 also shooting back into their initial position illustrated in FIG. 1. It is possible to brake the shooting movement into a slower movement by means of a pneumatic spring or the like.

Figure 5:
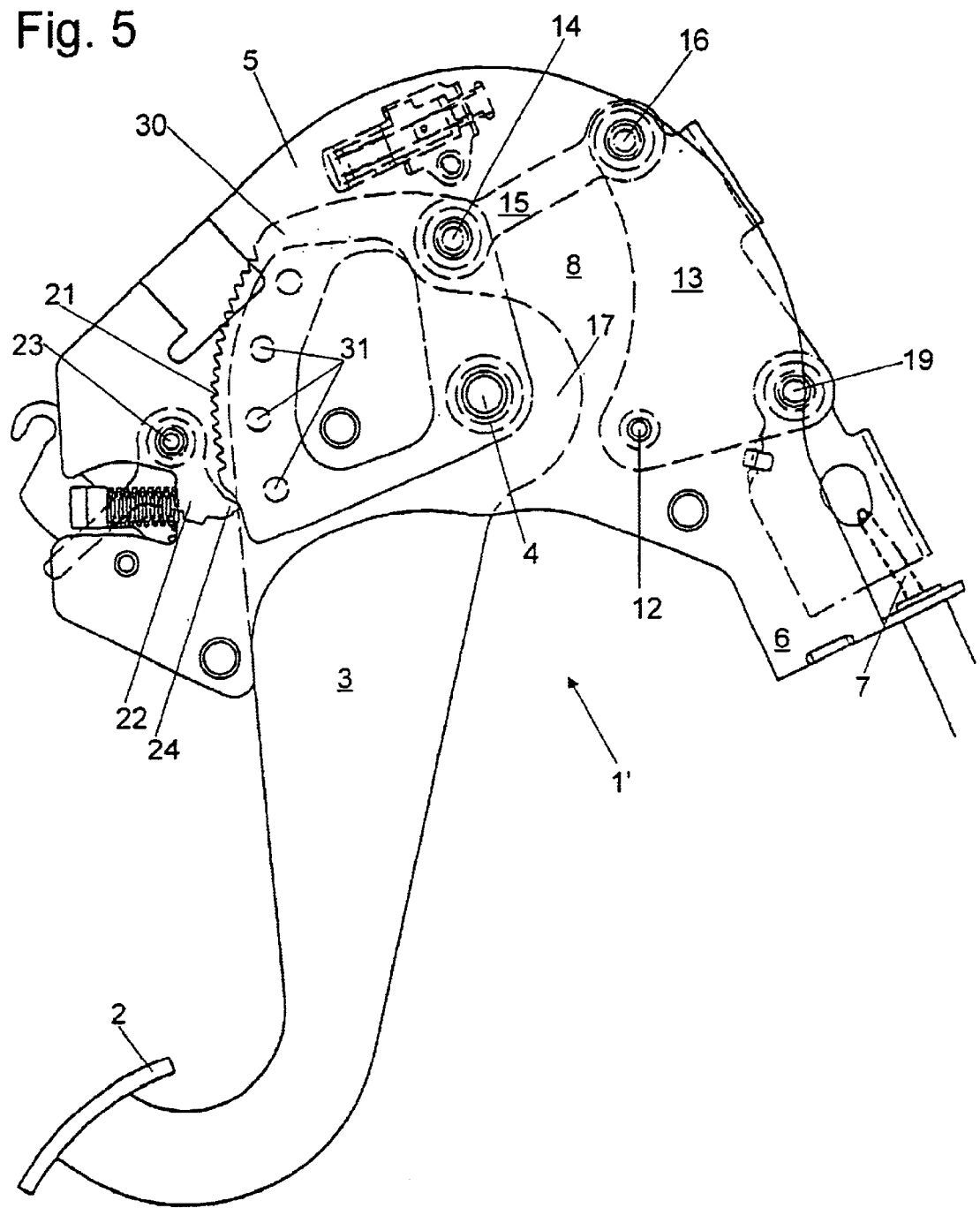
FIG. 5 shows a side view of a further preferred exemplary embodiment of a parking brake according to the invention.

The further exemplary embodiment, illustrated in FIG. 5, of a parking brake 1' according to the invention has essentially the same components as the parking brake 1 described above, and therefore the same reference symbols are used for simplification, insofar as the parts are functionally identical, and only the differences are dealt with in more detail below.

The parking brake 1' likewise comprises a brake actuation lever 3 which is provided with a pedal 2 and which is connected via an articulation 4 to the lever holder 5 designed as a housing. Fixed to the brake actuation lever 3 is an intermediate part 30 which is provided at the edge with a toothed quadrant 21 and which is likewise articulated on the lever holder 5 in the main bearing 4. The fastening of the intermediate part 30 to the brake actuation lever 3 takes place via riveted connections 31, which are provided near the toothed quadrant 21, and, furthermore, may be provided in the region of the articulation 4. The intermediate part 30 is perforated in its central region, in order as far as possible to save weight.

At a distance from the articulation 4, which is arranged in the projection 17 of the brake actuation lever 3, and outside the brake actuation lever 3, the intermediate part 30 has provided on it a joint 14 which connects the intermediate part 30 and the brake actuation lever 3 to an intermediate link 15, the other end of which is connected to a deflection lever 13 in the region of a joint 16.

The deflection lever 13 has an essentially triangular design and is connected to the lever holder 5 via an articulation 12, the articulation 12 and the joint 16 being arranged at different corners of the deflection lever 13. In the third corner of the deflection lever 13 is illustrated a cable outlet, designated by 19, for a brake cable 7 which, in the present exemplary embodiment, is designed without an adjustment device. It has to be understood that an adjustment device may nevertheless be articulated at this point. It can be seen that, under the tensile stress of the intermediate lever 15 as a result of the actuation of the brake actuation lever 3, the triangular deflection lever 13 is pivoted about the articulation 12 in the direction of the projection 17 of the brake actuation lever 3, and, at the same time, the coupling unit, designed as a cable outlet 19, for the brake cable 7 is pivoted about a radius corresponding to the distance from the articulation 12, with the result that the brake shoes of the cable brake or, if appropriate, brake cylinders are acted upon correspondingly.

In contrast to the previous exemplary embodiment, a long hole 18 is no longer necessary, since the two parts pivotably moveable relative to one another, namely the brake actuation lever 3 with the attached intermediate part 30 and the deflection lever 13, can be pivoted past one another, without touching one another. Correspondingly, one edge between the articulations 12 and 16 of the deflection lever 13 is designed to be inwardly concave, while the projection 17, designed to project convexly, of the brake actuation lever 3 is rotated past the deflection lever 13 even when the brake actuation lever 3 is actuated.

A particular advantage of the parking brake 1' is that the brake actuation lever 3 can be produced from plastic, while the intermediate part 30 together with the toothed quadrant 21 formed on it is produced from steel, so the large-volume part is manufactured from relatively lightweight material and the intermediate part 30 subjected to high stress both in the region of the toothing 21 and in the region of the articulations 14 and 4 is manufactured from a correspondingly tough and resistant material. Alternatively to a steel part, a part consisting of a ceramic material or of a material similar to aluminum or magnesium would also come under consideration. Since both the region of the articulation 4 and the region of the articulation 14 are formed by the intermediate part 30, a high torque can be transmitted to the intermediate lever 15 via the articulation 14 in spite of a long lever between the pedal 2 and the articulation 4.

The invention was explained above with reference to defined axis center distances of the joints 4, 16, 14, 12. It has to be understood that, according to the invention, the axis center distances may also be arranged differently in order to set a defined transmission ratio, and it has to be understood, furthermore, that, to achieve a more favorable transmission ratio, a further intermediate lever 15 may also be provided or the latter may also be omitted completely.

The invention was explained in more detail above, by way of example, with reference to a foot-operated parking brake 1 or 1'. It has to be understood that the parking brake according to the invention may also be designed as a hand-operated parking brake, in which case the brake actuation lever 3 is provided with a handle, in which a release button for actuating the linkage 25 for releasing the locking pawl 22 may also preferably be provided, in which case the cable outlet 19 is arranged on the deflection lever 13 in such a way that the latter has a correspondingly favorable position for the installation of the lever holder 5 between the driver's seat and the front-passenger's seat in the known manner for the outlet of the brake cable 7.

The invention was described above with reference to a brake cable as a transmission member to associated brake shoes. It has to be understood that linkage portions or adjustment devices may additionally be provided. It has to be understood, furthermore, that the brake cable may also be designed as a whole as a linkage or as a hydraulic connection to brake cylinders.

What is claimed is:

1. A parking brake for a vehicle, the parking brake comprising:
   a lever holder including a housing, wherein the housing comprises a first flat side and a second flat side;
   a brake actuation lever pivotably arranged on said lever holder, wherein said brake actuation lever is articulated to the first flat side and to the second flat side of said housing;
   a locking arrangement for holding said brake actuation lever in a locking position;
   a brake cable;
   a deflection lever pivotably articulated to the first flat side and to the second flat side of said housing, wherein said deflection lever is pivotably linked with said brake actuation lever and wherein the deflection lever is substantially arranged within the level holder; and
   a coupling unit for tensioning said brake cable during a displacement of said brake actuation lever, wherein said coupling unit is provided on said deflection lever.

2. The parking brake as claimed in claim 1, wherein said brake actuation lever comprises a projection, said lever holder providing an articulation of said deflection lever, and wherein said deflection lever executes a pivoting movement about said articulation towards the projection when said brake actuation lever is actuated.

3. The parking brake as claimed in claim 1, further comprising a joint connecting the brake actuating lever with the deflection lever, wherein the joint is substantially arranged within the lever holder.

4. The parking brake as recited in claim 3, wherein the deflection lever is substantially arranged within the lever holder.

5. A parking brake for a vehicle, the parking brake comprising:
   a lever holder including a housing, wherein the housing comprises a first flat side and a second flat side;
   a brake actuation lever pivotably arranged on said lever holder, wherein said brake actuation lever is articulated to the first flat side and to the second flat side of said housing;
   a locking arrangement for holding said brake actuation lever in a locking position;
   a brake cable:
   a deflection lever pivotably articulated to the first flat side and to the second flat side of said housing, wherein said deflection lever is pivotably linked with said brake actuation lever;
   a coupling unit for tensioning said brake cable during a displacement of said brake actuation lever, wherein said coupling unit is provided on said deflection lever, wherein said deflection lever includes a receptacle having a first deflection-lever flat side including a first recess and a second deflection-lever flat side including a second recess, and a joint connecting said brake actuation lever to said lever holder, the joint passing through said first and second recesses.

6. The parking brake as claimed in claim 5, further comprising an intermediate lever pivotably disposed for linking said brake actuation lever with said deflection lever.

7. The parking brake as claimed in claim 6, further comprising an intermediate part held rigidly in said brake actuation lever and wherein said brake actuation lever is connected to said intermediate lever via the intermediate part.

8. The parking brake as claimed in claim 7, wherein said intermediate part includes a quadrant which comprises a toothing, and wherein said intermediate lever is articulated to said intermediate part via an articulation.

9. The parking brake as claimed in claim 7, wherein said intermediate part is rigidly connected to said brake actuation lever, and wherein said intermediate part is mounted together with said brake actuation lever on said lever holder via an articulation.

10. The parking brake as claimed in claim 7, wherein said intermediate part is fastened to said brake actuation lever by riveting.

11. The parking brake as claimed in claim 6, wherein said deflection lever has an essentially triangular shape having three corners, wherein an articulation is arranged in each of the three corners, a first of said three corners being provided with a first articulation with said lever holder, a second of said three corners being provided with a second articulation with said intermediate lever and a third of said three corners being provided with a third articulation with said coupling unit.

12. The parking brake as claimed in claim 6, wherein said intermediate lever is essentially tension-loaded.

13. The parking brake as claimed in claim 6, wherein said intermediate lever has a first end pivotably connected to said brake actuation lever in a jointed manner, and a second end pivotably connected to said deflection lever in a jointed manner.

14. The parking brake as claimed in claim 5, further providing a jointed connection disposed between said deflection lever and said lever holder, wherein said deflection lever comprises a boundary facing away from the jointed connection, wherein said deflection lever comprises a toothed element disposed at the boundary of the deflection lever, and further providing a locking pawl disposed in a jointed manner on said lever holder, wherein the toothed element and the locking pawl define said locking arrangement, and wherein the toothed element is disposed, directed outwardly, between said first deflection-lever flat side and said second deflection-lever flat side.

15. The parking brake as claimed in claim 5, further comprising a trigger unit for releasing said locking arrangement.

16. The parking brake as claimed in claim 5, wherein a step-up of said brake actuation lever with respect to said brake cable by a factor of between 5 and 11 is provided.

17. The parking brake as claimed in claim 5, wherein said coupling unit comprises a cable adjustment arrangement for said brake cable.

18. The parking brake as claimed in claim 5, wherein said brake actuation lever includes a foot-operated parking brake comprising a pedal.

19. The parking brake as claimed in claim 5, wherein said housing of said lever holder comprises an orifice designed for a passage of said deflection lever and of said brake actuation lever, and wherein the orifice is disposed perpendicularly to said first flat side and said second flat side.

20. The parking brake as claimed in claim 5, further providing a joint for connecting said lever holder to said brake actuation lever, and wherein said deflection lever is disposed for pivoting past said joint.

21. A parking brake for a vehicle, the parking brake comprising:
- a lever holder including a housing, wherein the housing comprises a first flat side and a second flat side;
- a brake actuation lever pivotably arranged on said lever holder, wherein said brake actuation lever is articulated to the first flat side and to the second flat side of said housing;
- a locking arrangement for holding said brake actuation lever in a locking position;
- a brake cable;
- a deflection lever pivotably articulated to the first flat side and to the second flat side of said housing, wherein said deflection lever is pivotably linked with said brake actuation lever;
- a coupling unit for tensioning said brake cable during a displacement of said brake actuation lever, wherein said coupling unit is provided on said deflection lever;
- a jointed connection disposed between said deflection lever and said lever holder, wherein said deflection lever comprises a boundary facing away from the jointed connection; a toothed element disposed at the boundary of the deflection lever; and a locking pawl disposed in a jointed manner on said lever holder, such that the toothed element and the locking pawl are capable of holding said brake actuation lever in said locking position.

22. The parking brake as claimed in claim 21, further providing a pawl spring for prestressing said locking pawl in a direction of said toothed element.

23. The parking brake as claimed in claim 21, wherein said locking pawl is disposed on a short lever, wherein said locking pawl is facing a toothing of said toothed element, wherein said locking pawl includes an engagement nose for fixing said brake actuation lever in a pulled-on position, when engaging with the toothing.

24. The parking brake as claimed in claim 21, wherein said locking pawl includes a sheet-metal pressed part.

25. A parking brake for a vehicle, the parking brake comprising:
- a lever holder including a housing, wherein the housing comprises a first flat side and a second flat side;
- a brake actuation lever pivotably arranged on said lever holder, wherein said brake actuation lever is articulated to the first flat side and to the second flat side of said housing;
- a locking arrangement for holding said brake actuation lever in a locking position;
- a brake cable;
- a deflection lever pivotably articulated to the first flat side and the second flat side of said housing, said deflection lever being pivotably linked with said brake actuation lever;
- a coupling unit for tensioning said brake cable during a displacement of said brake actuation lever, wherein said coupling unit is provided on said deflection lever; and
- a joint connecting the brake actuating lever with the deflection lever, wherein the joint is substantially arranged within the lever holder.

* * * * *